3,787,501
3,5-DISUBSTITUTED-2-HYDROXY-ACETOPHENONES

Andrew G. Kallianos, Albert H. Warfield, and Melvyn I. Simpson, Durham, N.C., assignors to Liggett & Myers Incorporated, New York, N.Y.
No Drawing. Original application Sept. 11, 1969, Ser. No. 857,211, now Patent No. 3,605,760, dated Sept. 20, 1971. Divided and this application Oct. 7, 1970, Ser. No. 78,913
Int. Cl. C07c *49/78*
U.S. Cl. 260—592       5 Claims

ABSTRACT OF THE DISCLOSURE 3,5-disubstituted-2-hydroxyacetophenones, such as 3,5-diisopropyl-2-hydroxyacetophenone, are prepared by the base-catalyzed reaction of a 2,4-disubstituted-2-butenal, e.g., 2,4-diisopropyl-2-butenal, with an ester of acetoacetic acid. The thus-produced substituted 2-hydroxyacetophenones are useful as tobacco flavorants.

---

This is a divisional application of our copending application Ser. No. 857,211, filed Sept. 11, 1969, now U.S. Pat. No. 3,605,760.

This invention relates to 3,5-disubstituted-2-hydroxyacetophenones and to a method for their manufacture. In another aspect this invention relates to the use of 3,5-disubstituted-2-hydroxyacetophenones as tobacco flavorants.

The 3,5-disubstituted-2-hydroxyacetophenones with which this invention is concerned may be represented by the formula:

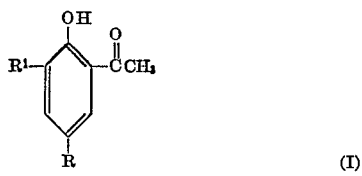

(I)

wherein each of R and $R^1$, when taken separately, is lower alkyl or lower alkenyl, with the proviso that there be no more than about 8 carbons in both R and $R^1$.

By the terms "lower alkyl" and "lower alkenyl" are meant alkyl or alkenyl groups of up to about 7 carbons, including branched or straight chain groups, such as methyl, ethyl, n-propyl, isopropyl, n-butyl, heptyl, vinyl, allyl, isopropenyl, crotyl and the like. Particularly preferred alkyl and alkenyl groups are those having no more than 4 carbons.

All of these compounds, except the 3,5-dimethyl derivatives, are novel. However, those compounds wherein at least one and preferably each of R and $R^1$ contains at least 3 carbons, and especially contains only 3 carbons, are highly preferred as tobacco flavorants. 3,5-diisopropyl-2-hydroxyacetophenone is most preferred.

The compounds of Formula I are produced by the base-catalyzed reaction of a 2,4-dialkyl or 2,4-dialkenyl-2-butenal with an acetocacetic ester, as illustrated by Equation A:

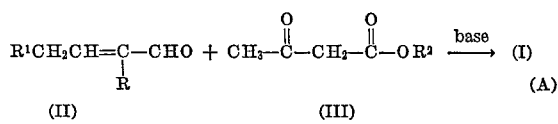

(A)

wherein R and $R^1$ are as previously defined and $R^2$ is lower alkyl, preferably ethyl.

The ratio of reactants is not critical, although the acetoacetic ester (III) is preferably employed in molar excess, with mole ratios of (III) to 2-butenal (II) of from 1.5:1 to about 2.5:1 being particularly preferred.

The base catalyst can be an inorganic base, such as an alkali metal hydroxide, e.g., sodium or potassium hydroxide, or an organic base, including alkali metal alkoxides such as sodium methoxide or sodium ethoxide, amine bases such as pyridine and piperidine, etc. The catalytic amount of base is not narrowly critical, although a ratio of at least 0.25 mole per mole of 2-butenal is preferred.

The reaction is normally conducted in the presence of an inert organic solvent, such as an aliphatic or aromatic hydrocarbon, with aromatic solvents being preferred. Suitable solvents include octane, decane benzene, toluene, xylene, etc. The amount of solvent is not critical provided a sufficiently fluid reaction mixture is obtained. In general, a concentration of combined reactants (II) and (III) in the range of from about 25 to 75 percent by weight has been found suitable.

The reaction of 2-butenal with acetoacetic ester is conducted at elevated temperatures, i.e., at temperatures in excess of about 30° C. Temperatures of from about 70° C. to about 160° C. are preferred.

The 3,5-disubstituted-2-hydroxyacetophenones are recovered from the reaction mixture by conventional means, such as distillation.

The reactants employed in the above described reaction are either readily available, such as the acetoacetic ester, or can be easily obtained from available materials. For example, the 2-butenals wherein R and $R^1$ are the same can be obtained by the aldol condensation of an aldehyde followed by dehydration to remove the $\beta$-hydroxyl group as illustrated by the following equation:

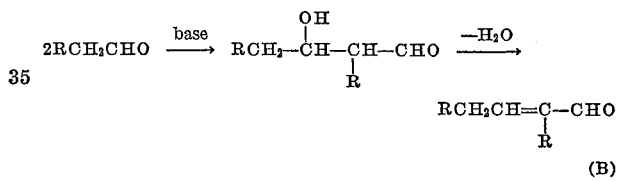

(B)

2-butenals wherein R and $R^1$ are different can be obtained in a similar manner starting with two different aldehydes, but a mixture of four possible compounds may result, which may be difficult to separate; hence this reaction could be inefficient in producing a specific compound. 2-butenals wherein R and $R^1$ are the same or different may also be obtained by reaction of an acetal with an alkyl 1-alkenyl ether as follows.

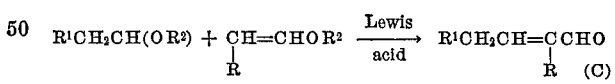

(C)

The 3,5-disubstituted-2-hydroxyacetophenones are useful as tobacco flavorants, and generally impart a rich, velvety, chocolate-like taste which is predominant mostly in the aftertaste. Suitable amounts of the additive are ordinarily in the range of from about 0.0001 to about 0.01 percent, based upon the weight of tobacco, although higher and lower amounts can be employed if desired.

The 3,5-disubstituted-2-hydroxyacetophenone is blended with the tobacco in any convenient manner. For example, it can be dissolved in a suitable solvent, such as ethanol or propylene glycol, and the resulting solution sprayed on the tobacco. Alternatively, the substituted acetophenone can be blended with other tobacco additives and then mixed into the tobacco. Thus it can be incorporated into blends normally employed to produce reconstituted tobacco sheet.

The following examples illustrate the preparation and characteristics of representative 3,5-disubstituted-2-hydroxyacetophenones.

EXAMPLE I

3,5-dimethyl-2-hydroxyacetophenone

To 100 grams of propionaldehyde at 0° C. was added, with stirring, a 15% potassium hydroxide solution at a rate sufficient to maintain the reaction temperature below 8° C. until no temperature rise occurred upon further addition. The resulting mixture was allowed to warm to room temperature and held, with stirring, for 2 hours. The aqueous layer was then separated and washed with ether. The ether extract was combined with the organic layer which was then washed successively with 10% acetic acid, 10% sodium bicarbonate, and water. After drying over anhydrous sodium sulfate, the ether was evaporated and the residue was distilled in vacuo through a Vigreux column to give 50.3 grams of 2-methyl-2-pentenal, B.P. 41–45°/18 mm. The assigned structure was confirmed by infrared, NMR, and mass spectra. The 2,4-dinitrophenylhydrazone melted at 165.2–165.7° after recrystallization from ethyl acetate.

The 2-methyl-2-pentenal thus produced (0.1 mole) and ethyl acetoacetate (0.2 mole) were dissolved in 25 ml. of pyridine, and 0.5 ml. of piperidine and 100 ml. of benzene were added. The resulting solution was refluxed for 1 day, water being removed through a Dean-Stark trap. One hundred ml. of solvent was distilled off and the solution was refluxed for 2 additional days. Vacuum distillation gave 8.1 grams of semi-solid 3,5-dimethyl-2-hydroxyacetophenone (B.P. 126–140°/33 mm.) which, after recrystallization from aqueous methanol, melted at 53–53.5°. The assigned structure was confirmed by its infrared, ultraviolet, and NMR spectra.

*Analysis.*—Calcd. for $C_{10}H_{12}O_2$ (percent): C, 73.15; H, 7.37. Found (percent): C, 72.74;; H, 7.50.

EXAMPLE II

3,5-di-n-propyl-2-hydroxyacetophenone

Employing procedures similar to those described in Example I, 50 grams of n-valeraldehyde was self-condensed to yield 17 grams of 2-n-propyl-2-heptenal, B.P. 102–105°/16 mm., and this product (0.1 mole) was then reacted with 0.2 mole of ethyl acetoacetate to give 9.24 grams of 3,5-di-n-propyl-2-hydroxyacetophenone as a liquid distilling at 80–90°/0.075 mm. The assigned structure was confirmed by infrared, ultraviolet, and NMR analysis. The 2,4-dinitrophenylhydrazone was prepared and, after recrystallization from ethyl acetate, melted as 174–174.5°.

*Analysis.*—Calcd. for $C_{20}H_{24}N_4O_5$ (percent): C, 59.99; H, 6.04; N, 13.99. Found (percent): C, 59.78; H, 6.31; N, 13.89.

EXAMPLE III

3,5-diisopropyl-2-hydroxyacetophenone

Employing procedures similar to those described in Example I, 50 grams of isovaleraldehyde was self-condensed to yield 21 grams of 2-isopropyl-5-methyl-2-hexenal, B.P. 95–100°/24 mm. The assigned structure was confirmed by infrared and mass spectra. The 2,4-dinitrophenylhydrazone, after recrystallization from methanol, melted at 112–114°. The thus-produced isopropylmethylhexenal (0.1 mole) was then reacted with 0.2 mole of ethyl acetoacetate to yield 3,5-diisopropyl-2-hydroxyacetophenone boiling at 70–80°/0.05–0.10 mm. After recrystallization from aqueous methanol there was obtained 28.8 grams of product, M.P. 37°. The assigned structure was confirmed by infrared, ultraviolet, and NMR analysis.

*Analysis.*—Calcd. for $C_{14}H_{20}O_2$ (percent): C, 76.33; H, 9.15. Found (percent): C, 76.25; H, 8.96.

The 2,4-dinitrophenylhydrazone melted at 169.5–170.5°.

*Analysis.*—Calcd. for $C_{20}H_{24}N_4O_5$ (percent): C, 59.99; H, 6.04; N, 13.99. Found (percent): C, 59.92; H, 6.11; N, 13.88.

EXAMPLE IV

3,5-diisobutyl-2-hydroxyacetophenone

To a mixture of 16.4 grams of lithium aluminum hydride in 400 ml. of ether was added, with stirring, 52.8 grams of ethyl acetate over a period of 45 minutes. The resulting mixture was stirred for an additional 20 minutes and 38.8 grams of isocapronitrile was added rapidly at 0°. After stirring an additional hour, the mixture was hydrolyzed by the addition of 400 ml. of 15% sulfuric acid. The aqueous layer was separated and extracted with ether and the combined ether extracts were washed with saturated aqueous sodium bicarbonate, six 30 ml. portions of cold water, and saturated aqueous sodium chloride. After drying over magnesium sulfate, most of the ether was evaporated to give an ethereal solution of isocaproaldehyde, yield approximately 42%.

Employing procedures similar to those described in Example I, the thus-produced isocaproaldehyde was self-condensed to give 2-isobutyl-6-methyl-2-heptenal, B.P. 110–124°/20–25 mm., in 22 percent yield. The assigned structure was confirmed by spectral analyses. The 2,4-dinitrophenylhydrazone melted at 180–181.5°.

*Analysis.*—Calcd. for $C_{18}H_{26}N_4O_4$ (percent): C, 59.65; H, 7.23; N, 15.46. Found (percent): C, 59.23; H, 7.28; N, 15.56.

The 2-isobutyl-6-methyl-2-heptenal was reacted with ethyl acetoacetate to give 3,5-diisobutyl-2-hydroxyacetophenone in 29 percent yield, B.P. 116–118°/1–2 mm. The assigned structure was confirmed by infrared, ultraviolet, and mass spectra. The 2,4-dinitrophenylhydrazone, after chromatography over silica gel and recrystallization from methanol-ethyl acetate, melted at 197–199°.

*Analysis.*—Calcd. for $C_{22}H_{28}N_4O_5$ (percent): C, 61.66; H, 6.59; N, 13.08. Found (percent): C, 61.81; H, 6.69; N, 13.30.

EXAMPLE V

3-isopropyl-5-methyl-2-hydroxyacetophenone

A mixture of 60 grams of a 5:1 mixture of propionaldehyde diethyl acetal and ethyl orthoformate, and 1.5 grams of potassium bisulfate was heated with stirring at 108–110° while distilling the product through a vacuum-jacketed Vigreux column at a pressure of 410 mm. After 3 hours an additional 1.5 grams of potassium bisulfate was added and distillation was continued. This procedure was repeated twice.

The distillate, which was collected in a Dry Ice cooled flask, was washed twice with ice-cold water to remove ethanol, dried over sodium sulfate, and distilled through the Vigreux column to yield 15.1 grams of ethyl propenyl ether, B.P. 55–65°.

To a stirred solution of 5 grams of isovaleraldehyde diethyl acetal and 0.3 gram of zinc chloride in 5 ml. of ethyl acetate was added, dropwise at room temperature, 5.1 grams of ethyl propenyl ether over a period of 0.5 hour. The reaction mixture was stirred for three days after which was added a solution of 1.7 grams of sodium acetate and 13 ml. of acetic acid in 7 ml. of water. The resulting mixture was stirred on a steam bath for three hours and, after cooling, the thus-obtained pale yellow solution was poured into 150 ml. of ice water and extracted twice with ether. The combined ether extracts were washed with saturated aqueous sodium bicarbonate followed by water until the washings were neutral. After shaking with saturated sodium chloride solution, drying over sodium sulfate, concentrating on a rotary evaporator, and distilling there was obtained 1 gram of 2,5-dimethyl-2-hexenal, B.P. 62–64°/10–15 mm. The 2,4-dinitrophenylhydrazone melted at 153.5–155°.

*Analysis.*—Calcd. for $C_{14}H_{18}N_4O_4$ (percent): C, 54.89; H, 5.92; N, 18.29. Found (percent): C, 55.34; H, 5.85; N, 18.14.

The thus-produced 2,5-dimethyl-2-hexenal was reacted with ethyl acetoacetate to give, after molecular ditsillation at a block temperature of 70–80° and a pressure of 1–2 mm., 3 - isopropyl-5-methyl-2-hydroxyacetophenone as a yellow oil. The assigned structure was confirmed by infrared, ultraviolet, and mass spectra.

The 2,4-dinitrophenylhydrazone melted at 224–225.5°. *Analysis.*—Calcd. for $C_{18}H_{20}N_4O_5$ (percent): C, 58.05; H, 5.41; N, 15.05. Found (percent): C, 57.94; H, 5.42; N, 14.61.

EXAMPLE VI 3,5-diallyl-2-hydroxyacetophenone 4-pentenol was oxidized to the corresponding aldehyde with chromic acid-pyridine complex according to the procedure of Collins et al. (J. C. Collins, W. W. Hess and F. J. Frank, Tetrahedron Letters, 3363 (1968)). The product, collected at a temperature of 87–106, consisted of a mixture of pyridine and aldehyde and was used for the subsequent reaction without further purification;

$$\lambda_{max}^{CCl_4} \ 5.79\mu$$

2,4-dinitrophenylhydrazone, M.P. 122.5–123°.

Aldol condensation of 4-pentenal was achieved as follows. Twenty grams of the mixture of 4-pentenal and pyridine were dissolved in 15 ml. of ether and cooled to 0°. To the cool solution was added with stirring over a period of 45 minutes 20 ml. of a solution of 15% potassium hydroxide. The mixture was stirred on the ice bath for an additional two hours and then at room temperature for 5 days.

The layers were then separated and the aqueous layer was extracted twice with ether. The combined ether layers were washed sequentially with 2 N acetic acid, saturated sodium bicarbonate solution, and water. After drying with anhydrous sodium sulfate, evaporation of the ether gave 2-allyl-2,6-heptadienal as an oil which was used for the succeeding reaction without purification. The assigned structure was confirmed by infrared and mass spectra.

2,4 - dinitrophenylhydrazone, recrystallized from ethanol, melted at 116–117°. The molecular weight was confirmed by mass spectrometry.

A solution consisting of 1.7 g. of 2-allyl-2,6-heptadienal, 4.0 g. of ethyl acetoacetate, 6 ml. of pyridine, 0.4 ml. piperidine, and 20 ml. benzene was stirred at 60–70° overnight. The volatiles were removed on a rotary evaporator under reduced pressure and the black residue was stirred at 115–120° for 2 days with an additional 15 ml. pyridine and 0.5 ml. piperidine.

The pyridine, piperidine, and excess ethyl acetoacetate were distilled off under reduced pressure and the dark residue was molecularly distilled at a block temperature of 90–95° and a pressure of 1–2 mm., yielding 0.8 g. of 3,5-diallyl-2-hydroxyacetophenone as a yellow oil. The assigned structure was confirmed by infrared and ultraviolet spectra.

The 2,4-dinitrophenylhydrazone was chromatographed on silica gel, eluted with 50% benzene-methylene chloride and recrystallized from ethanol; M.P. 159–160°.

*Analysis.*—Calcd. for $C_{20}H_{20}N_4O_5$ (percent): C, 60.60; H, 5.09; N, 14.13. Found (percent): C, 60.33; H, 5.23; N, 13.96.

The examples set forth above are for illustrative purposes only and are not intended to limit our invention to the compounds listed. Specific examples of incorporating substituted acetophenones into a tobacco product are as follows:

EXAMPLE VII

Approximately 10 milligrams of each of the products of Examples I–V was dissolved in separate 1.0 ml. portions of ethanol. Aliquots of 10μ l. of each of thus-obtained solutions were injected uniformly along a path of 55 mm. length in experimental cigarettes manufactured from a commercial blend of tobaccos and the solvent was removed from each cigarette by a gentle stream of air.

The smoke characteristic of each sample was evaluated by an experienced taste panel, and compared to a corresponding control cigarette prepared in a similar manner but not containing the 3,5-dialkyl-2-hydroxyacetophenone. The cigarette containing 3,5 - dimethyl-2-hydroxyacetophenone (Example I) had a well balanced smoke with good fragrance slightly better than the control. The cigarette containing the 3,5-di-n-propyl-2-hydroxyacetophenone (Example II) produced a smoke having a significantly higher amplitude of flavor and a more complex blended tobacco fragrance with a dominant sweet flavor suggesting chocolate. The 3,5 - diisopropyl-2-hydroxyacetophenone-treated cigarettes produced a smoke of heavy tobacco fragrance, reminiscent of burley tobacco, and a heavy sweet flavor of cocoa, the effect being judged to be definite as opposed to slight or marginal. To a lesser degree this sample produced a smoke with more fullness, better balance of flavor and less drying than the control. Cigarettes treated with 3,5-diisobutyl-2-hydroxyacetophone (Example IV) produced a smoke having sweet and green-floral notes at lower intensities in the sample than in the control as were the burnt and bitter notes. Finally, the 3-isopropyl - 5-methyl-2-hydroxyacetophenone-treated cigarettes produced a smoke which had less impact and was smoother than the control and had some pleasant chocolate character associated with the sweet noted, although also providing an oily note.

EXAMPLE VIII

A solution of 0.0227 gram of 3,5-diisopropyl-2-hydroxyacetophenone in 5 ml. of ethanol was sprayed onto 227 grams of cut Bright tobacco stems. After evaporation of the solvent, 10 grams of the treated stems were mixed with 190 grams of a commercial blend of cased and cut tobaccos. The composite was manufactured into cigarettes on a Chico-type cigarette making machine. These cigarettes produced a smoke with a heavy cocoa-like flavor and a low-level, sour-acrid note, with decreased bitter and stemmy taste as compared to a control cigarette, and was judged to be a definite improvement over the control.

EXAMPLE IX

The experiment of Example VIII was repeated, except that 0.054 gram of the 3,5-diisopropyl-2-hydroxyacetophenone was dissolved in ethanol. The resulting cigarettes produced a deep, rich and flavorful smoke with increased coating and drying, although the additive was at a higher than optimum level for general purpose use.

EXAMPLE X

A solution of 12 grams of 3,5-diisopropyl-2-hydroxyacetophenone in 3 liters of a liquid flavoring composition normally used as a "top dressing" for treating tobacco destined for manufacture of cigarettes was applied to a commercial blend of cased and cut tobacco by spraying at a rate of 0.71 liter per 100 pounds of tobacco. The resulting tobacco was used to manufacture cigarettes in a conventional high-speed cigarette making machine and the cigarettes were fitted with cellulose acetate filters. The thus-manufactured cigarettes produced smoke with enhanced tobacco fragrance and flavor balance when compared to the control.

While several embodiments of this invention are shown above, it will be appreciated that the invention is not limited thereto, since many modifications will be obvious to those skilled in the art, and that the present invention is defined by the appended claims.

What is claimed is:

1. A 3,5-disubstituted-2-hydroxyacetophenone of the formula:

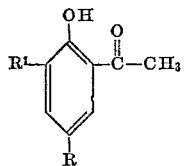

wherein R and R¹ are the same and are lower alkenyl of at least 3 carbons, there being no more than 8 carbons in R and R¹ combined.

2. A compound according to claim 1 wherein R and R¹ are allyl.

3. A method for producing 3,5-disubstituted-2-hydroxyacetophenones of the formula

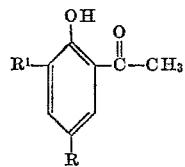

wherein each of R and R', when taken separately, is lower alkyl or lower alkenyl, which comprises heating at an elevated temperature a mixture of a base catalyst, a lower alkyl acetoacetate and a 2-butenal of the formula

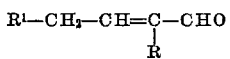

for a period of time sufficient to yield said acetophenone.

4. A method according to claim 3 wherein said acetoacetic ester is employed in molar excess.

5. A method according to claim 4 wherein said lower alkyl acetoacetate is ethyl acetoacetate and said catalyst is pyridine.

References Cited

UNITED STATES PATENTS

| | | | |
|---|---|---|---|
| 3,462,475 | 8/1969 | Strobel et al. | 260—592 |
| 2,974,171 | 3/1961 | Coffield | 260—592 |
| 3,335,164 | 8/1967 | Scherer et al. | 260—592 |

FOREIGN PATENTS

| | | | |
|---|---|---|---|
| 164,613 | 8/1964 | U.S.S.R. | 260—592 |
| 570,410 | 9/1958 | Belgium | 260—592 |

LEON ZITVER, Primary Examiner

N. MORGENSTERN, Assistant Examiner

U.S. Cl. X.R.

131—17